US012760830B2

(12) United States Patent
Yamada et al.

(10) Patent No.: US 12,760,830 B2
(45) Date of Patent: Oct. 13, 2026

(54) PULSATION-DAMPING MEMBER

(71) Applicant: NHK SPRING Co., Ltd., Yokohama (JP)

(72) Inventors: Yoshio Yamada, Yokohama (JP); Norihiro Tajima, Yokohama (JP); Shuji Takahashi, Yokohama (JP); Atsushi Yoneoka, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 490 days.

(21) Appl. No.: 18/280,591

(22) PCT Filed: Mar. 1, 2022

(86) PCT No.: PCT/JP2022/008594
§ 371 (c)(1),
(2) Date: Sep. 6, 2023

(87) PCT Pub. No.: WO2022/190963
PCT Pub. Date: Sep. 15, 2022

(65) Prior Publication Data

US 2024/0175533 A1 May 30, 2024

(30) Foreign Application Priority Data

Mar. 9, 2021 (JP) ................................ 2021-037218

(51) Int. Cl.
*F16L 55/04* (2006.01)
*F16L 55/05* (2006.01)

(52) U.S. Cl.
CPC ............... *F16L 55/05* (2013.01); *F16L 55/04* (2013.01)

(58) Field of Classification Search
CPC ......... F16L 55/05; F16L 55/04; F16L 55/045; F16L 55/00; F16L 55/041; F16L 55/053;
(Continued)

(56) References Cited

U.S. PATENT DOCUMENTS

2002/0153209 A1 10/2002 Nagy et al.
2009/0127356 A1* 5/2009 Junger .................. F02M 55/04 138/30

(Continued)

FOREIGN PATENT DOCUMENTS

CN 109070866 A 12/2018
DE 10353841 A1 10/2004

(Continued)

OTHER PUBLICATIONS

SIPO The First Office Action for corresponding CN Application No. 202280019843.9; Issued Jul. 31, 2025.

(Continued)

*Primary Examiner* — Craig M Schneider
*Assistant Examiner* — Joshua D Leary
(74) *Attorney, Agent, or Firm* — CANTOR COLBURN LLP

(57) ABSTRACT

A pulsation damping member includes a first metal plate and a second metal plate, a crest portion of the second metal plate enters inside a crest portion of the first metal plate, a valley portion of the first metal plate enters inside a valley portion of the second metal plate, a size in the axial direction of an outer end portion of an expansion/contraction space positioned on an outermost side in a radial direction and continuous with joint parts increases toward an inner side in the radial direction, and a first constricted portion having a smallest size in the axial direction in a portion of the expansion/contraction space positioned on an inner side with respect to the outer end portion in the radial direction is positioned on a radially outward side from a center portion between the central axis and the joint parts in the radial direction.

9 Claims, 5 Drawing Sheets

(58) Field of Classification Search
CPC ........ F16F 15/023; F16F 15/04; F16F 15/046; F16F 15/06; F16J 3/04; F16J 3/047; F15B 2201/32
USPC ............................................................ 138/30
See application file for complete search history.

(56) References Cited

U.S. PATENT DOCUMENTS

| | | | | |
|---|---|---|---|---|
| 2011/0017332 | A1 * | 1/2011 | Bartsch | B60T 8/42<br>138/30 |
| 2013/0008544 | A1 * | 1/2013 | Briesewitz | B60T 8/4068<br>138/30 |
| 2017/0307083 | A1 * | 10/2017 | Sato | F16J 3/04 |
| 2019/0152455 | A1 * | 5/2019 | Kai | B60T 17/221 |

FOREIGN PATENT DOCUMENTS

| | | | |
|---|---|---|---|
| JP | 2003530531 | A | 10/2003 |
| JP | 2009540206 | A | 11/2009 |
| JP | 6600410 | B2 | 10/2019 |
| WO | 2018153685 | A1 | 8/2018 |

OTHER PUBLICATIONS

International Search Report for International Application No. PCT/JP2022/008594; Date of Mailing, May 24, 2022.

* cited by examiner

PULSATION-DAMPING MEMBER

CROSS REFERENCE TO RELATED APPLICATIONS

This is the U.S. national stage of application No. PCT/JP2022/008594, filed on Mar. 1, 2022. Priority under 35 U.S.C. § 119 (a) and 35 U.S.C. § 365 (b) is claimed from Japanese Application No. 2021-037218, filed Mar. 9, 2021, the disclosure of which is also incorporated herein by reference.

TECHNICAL FIELD

The present invention relates to a pulsation damping member.

BACKGROUND ART

Conventionally, a pulsation damping member including a first metal plate and a second metal plate provided in an axial direction along a central axis is known. The first metal plate and the second metal plate respectively include joint parts that extend over the entire length in a circumferential direction around the central axis and are joined to each other. An expansion/contraction space is provided between the first metal plate and the second metal plate in a portion positioned on an inner side with respect to the joint parts in a radial direction intersecting the central axis when viewed in the axial direction.

The pulsation damping member is used by being provided inside a housing chamber connected to a pipe of a fluid pressure system. The pulsation damping member suppresses pulsation due to the first metal plate and the second metal plate elastically deforming in the axial direction while expanding and contracting the expansion/contraction space in the axial direction in accordance with pulsation of a fluid flowing through the pipe.

As this type of pulsation damping member, for example, a configuration in which a crest portion and a valley portion extending over the entire length in the circumferential direction are provided to line up in the radial direction in a portion positioned on an inner side with respect to the joint part in the radial direction in each of the first metal plate and the second metal plate, and apex portions of the valley portion of the first metal plate and the crest portion of the second metal plate face each other in the axial direction to abut against each other in the axial direction when a fluid pressure in the housing chamber has risen is known as described in Patent Document 1 below.

CITATION LIST

Patent Document

Patent Document 1
Japanese Patent No. 6600410

SUMMARY OF INVENTION

Technical Problem

In a conventional pulsation damping member, apex portions of a valley portion of a first metal plate and a crest portion of a second metal plate abut against each other in an axial direction when a fluid pressure in a housing chamber has risen. Therefore, it is difficult to secure compression strokes of the first metal plate and the second metal plate in the axial direction while reducing a size in the axial direction of the entire pulsation damping member.

The present invention has been made in consideration of such circumstances, and an objective of the present invention is to provide a pulsation damping member in which compression strokes of a first metal plate and a second metal plate in an axial direction can be secured while reducing a size in the axial direction of the entire pulsation damping member, and load applied to a joint part can be suppressed.

Solution to Problem

A pulsation damping member according to one aspect of the present invention is used by being provided inside a housing chamber connected to a pipe of a fluid pressure system, and includes a first metal plate and a second metal plate provided in an axial direction along a central axis, in which the first metal plate and the second metal plate respectively include joint parts extending over the entire length in a circumferential direction around the central axis and joined to each other, an expansion/contraction space is provided between the first metal plate and the second metal plate in a portion positioned on an inner side with respect to the joint parts in a radial direction intersecting the central axis when viewed from the axial direction, the first metal plate and the second metal plate are configured to elastically deform in the axial direction while expanding and contracting the expansion/contraction space in the axial direction in accordance with pulsation of a fluid flowing through the pipe, a crest portion and a valley portion extending over the entire length in the circumferential direction are provided to line up in the radial direction in a portion positioned on an inner side with respect to the joint parts in the radial direction in each of the first metal plate and the second metal plate, the crest portion of the second metal plate enters inside the crest portion of the first metal plate, and the valley portion of the first metal plate enters inside the valley portion of the second metal plate, a size in the axial direction of an outer end portion of the expansion/contraction space positioned on an outermost side in the radial direction and continuous with the joint parts increases toward an inner side in the radial direction, and a first constricted portion, which has a smallest size in the axial direction in a portion of the expansion/contraction space positioned on an inner side with respect to the outer end portion in the radial direction, is positioned on a radially outward side from a center portion between the central axis and the joint parts in the radial direction.

According to the above-described aspect, the crest portion of the second metal plate enters inside the crest portion of the first metal plate, and the valley portion of the first metal plate enters inside the valley portion of the second metal plate. Therefore, when a fluid pressure in the housing chamber has risen, the crest portion of the second metal plate enters deeply inside the crest portion of the first metal plate, and the valley portion of the first metal plate enters deeply inside the valley portion of the second metal plate. Thereby, compression strokes of the first metal plate and the second metal plate in the axial direction can be secured while reducing a size in the axial direction of the entire pulsation damping member.

The first constricted portion, which has a smallest size in the axial direction in a portion (hereinafter referred to as an inner space) of the expansion/contraction space positioned on an inner side with respect to the outer end portion in the radial direction, is positioned on a radially outward side from a center portion between the central axis and the joint parts in the radial direction. Therefore, the first constricted portion, which is first crushed in the axial direction in the inner space to bring the first metal plate and the second metal plate into contact with each other when the fluid pressure in the housing chamber has risen, can be positioned close to the joint parts. Therefore, a radial size of an outer circumferential portion of the expansion/contraction space positioned between the first constricted portion and the joint parts can be reduced. Thereby, after the first constricted portion is crushed in the axial direction in a process in which the fluid pressure in the housing chamber rises, it becomes difficult for the outer circumferential portion of the expansion/contraction space to contract and deform further in the axial direction, and a stress generated in the joint parts can be reduced.

As described above, compression strokes of the first metal plate and the second metal plate in the axial direction can be secured while reducing a size in the axial direction of the entire pulsation damping member, and load applied to the joint part can be suppressed.

The first constricted portion is positioned on a radially outward side from the center portion between the central axis and the joint parts in the radial direction. Therefore, a radial distance between the first constricted portion and the central axis is easily secured. Thereby, it is possible to prevent a region to be contracted and deformed in the axial direction after the first constricted portion is crushed in the axial direction in the process in which the fluid pressure in the housing chamber rises from reducing in size, and rapid increase in spring constant in the axial direction of the pulsation damping member can be suppressed.

The crest portion and the valley portion may each include an apex portion and a pair of inclined portions sandwiching the apex portion in the radial direction, and the first constricted portion may be provided between the inclined portions of the first metal plate and the second metal plate.

In this case, the first constricted portion is provided between the inclined portions of the first metal plate and the second metal plate. Therefore, it is possible to easily bring portions facing each other in the axial direction and defining the first constricted portion into surface contact with each other or the like when the fluid pressure in the housing chamber has risen, and load applied to the joint parts can be reliably suppressed.

In the first metal plate and the second metal plate, apex portions of the crest portions or the valley portions defining the first constricted portion may be deviated from each other in the radial direction.

In this case, in the first metal plate and the second metal plate, the apex portions of the crest portions or the valley portions defining the first constricted portion are deviated from each other in the radial direction. Therefore, the first constricted portion with a desired size in the axial direction can be easily provided.

In the first metal plate and the second metal plate, apex portions of the crest portions or the valley portions defining the first constricted portion may be formed such that, in a longitudinal sectional view in the axial direction, a radius of curvature of the apex portion of the crest portion or valley portion on a side of entering inside the other crest portion or valley portion is smaller than a radius of curvature of the apex portion of the crest portion or valley portion on a side into which the other crest portion or valley portion enters.

In this case, in the first metal plate and the second metal plate, the apex portions of the crest portions or the valley portions defining the first constricted portion are formed such that, in a longitudinal sectional view, a radius of curvature of the apex portion of the crest portion or valley portion on a side of entering inside the other crest portion or valley portion is smaller than a radius of curvature of the apex portion of the crest portion or valley portion on a side into which the other crest portion or valley portion enters. Therefore, the first constricted portion with a desired size in the axial direction can be easily provided.

Of portions of the crest portions or the valley portions defining the first constricted portion in the first metal plate and the second metal plate, one portion of the portions may enter inside the other portion and be formed in a curved surface shape which is convex toward the other portion, and the other portion may have a linear shape in a longitudinal sectional view in the axial direction.

In this case, of portions of the crest portions or the valley portions defining the first constricted portion in the first metal plate and the second metal plate, one portion of the portions enters inside the other portion and is formed in a curved surface shape which is convex toward the other portion. The other portion has a linear shape in a longitudinal sectional view. Therefore, the first constricted portion with a desired size in the axial direction can be easily provided.

Of portions of the crest portions or the valley portions defining the first constricted portion in the first metal plate and the second metal plate, one portion of the portions may enter inside the other portion and be formed in a curved surface shape which is convex toward the other portion, and the other portion may be formed in a curved surface shape which is convex in the same direction as the direction in which the one portion is convex, and a radius of curvature of the other portion may be larger than a radius of curvature of the one portion in a longitudinal sectional view in the axial direction.

Of portions of the crest portions or the valley portions defining the first constricted portion in the first metal plate and the second metal plate, one portion of the portions enters inside the other portion and is formed in a curved surface shape which is convex toward the other portion. In a longitudinal sectional view, the other portion is formed in a curved surface shape which is convex in the same direction as the direction in which the one portion is convex, and a radius of curvature of the other portion is larger than a radius of curvature of the one portion. Therefore, the first constricted portion with a desired size in the axial direction can be easily provided.

The crest portion and the valley portion may each include an apex portion and a pair of inclined portions sandwiching the apex portion in the radial direction, and the first constricted portion may be defined in an outer inclined portion, of the pair of inclined portions of the crest portion or the valley portion continuous with the joint part, positioned on an outer side in the radial direction.

In this case, the first constricted portion is defined in an outer inclined portion of the crest portion or the valley portion continuous with the joint part. Therefore, the first constricted portion can be reliably positioned close to the joint parts, and it is possible to easily bring the portions facing each other in the axial direction and defining the first constricted portion into surface contact with each other, or the like. Thereby, load applied to the joint parts can be reliably suppressed.

The first constricted portion is defined in an outer inclined portion of the crest portion or the valley portion continuous with the joint part. Therefore, a radial distance between the first constricted portion and the central axis can be easily secured. Thereby, a rapid increase in spring constant after the first constricted portion is crushed in the axial direction in the process in which the fluid pressure in the housing chamber rises can be reliably suppressed.

A second constricted portion, which is crushed in the axial direction following the first constricted portion in the portion of the expansion/contraction space positioned on an inner side with respect to the outer end portion in the radial direction to bring the first metal plate and the second metal plate into contact with each other when a fluid pressure in the housing chamber has risen, may be positioned on an inner side with respect to the first constricted portion in the radial direction.

In this case, the second constricted portion, which is crushed in the axial direction following the first constricted portion in the inner space to bring the first metal plate and the second metal plate into contact with each other when the fluid pressure in the housing chamber has risen, is positioned on an inner side with respect to the first constricted portion in the radial direction. Therefore, the expansion/contraction space can be contracted and deformed in the axial direction sequentially from an outer side to an inner side in the radial direction in the process in which the fluid pressure in the housing chamber rises, and compression strokes of the first metal plate and the second metal plate in the axial direction can be easily secured.

The crest portion and the valley portion may each include an apex portion and a pair of inclined portions sandwiching the apex portion in the radial direction, and of the pair of inclined portions sandwiching the same apex portion in the radial direction, the outer inclined portion positioned on an outer side in the radial direction may define the first constricted portion, and an inner inclined portion positioned on an inner side in the radial direction may define the second constricted portion.

In this case, the first constricted portion and the second constricted portion are respectively defined in the pair of inclined portions that sandwich the same apex portion in the radial direction. Therefore, a radial distance between the first constricted portion and the second constricted portion can be reduced. Therefore, compression strokes of the first metal plate and the second metal plate in the axial direction can be more easily secured, and load applied to the joint parts can be reliably suppressed. Also, a radial distance between the second constricted portion and the central axis is easily secured. Thereby, it is possible to prevent a region to be contracted and deformed in the axial direction after the second constricted portion is crushed in the axial direction in the process in which the fluid pressure in the housing chamber rises from reducing in size, and rapid increase in spring constant can be suppressed.

The pair of inclined portions define the first constricted portion and the second constricted portion, respectively. Therefore, it is possible to easily bring the portions facing each other in the axial direction and defining the first constricted portion into surface contact with each other and the portions facing each other in the axial direction and defining the second constricted portion into surface contact with each other, and the like. Thereby, load applied to the joint parts can be reliably suppressed.

Advantageous Effects of Invention

According to the present invention, compression strokes of the first metal plate and the second metal plate in the axial direction can be secured while reducing a size in the axial direction of the entire pulsation damping member, and load applied to the joint parts can be suppressed.

DESCRIPTION OF EMBODIMENTS

Figure 1:
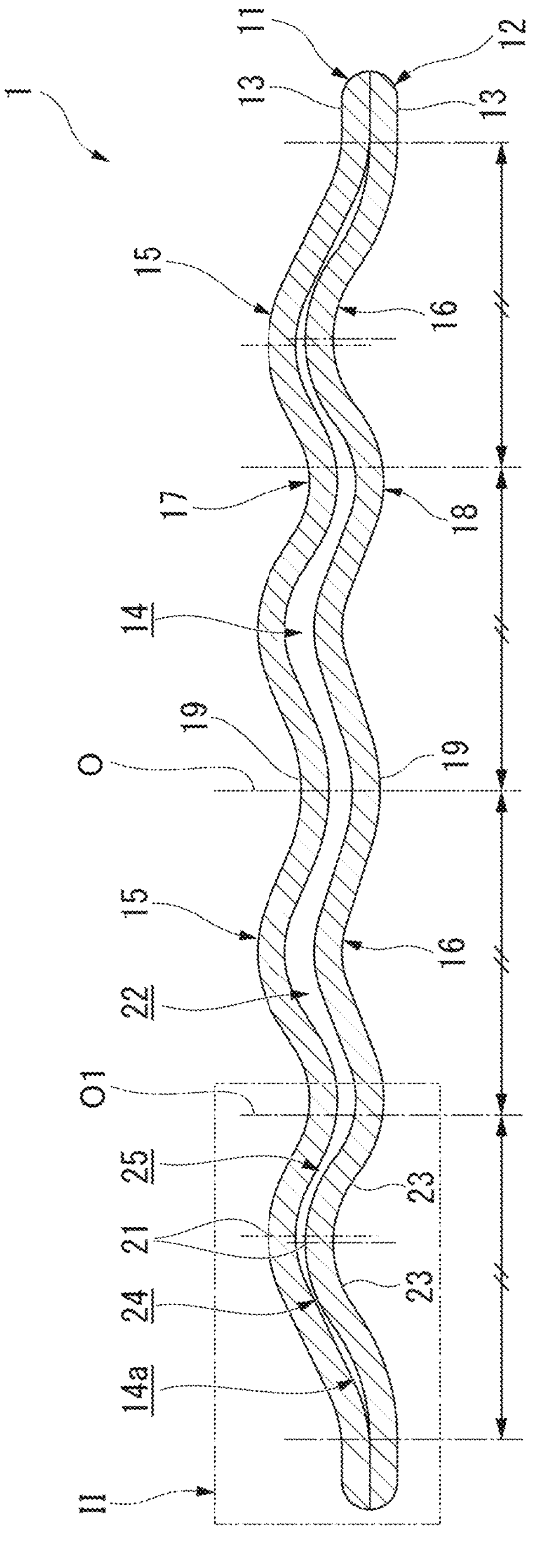
FIG. 1 is a longitudinal sectional view of a pulsation damping member of a first embodiment.

Hereinafter, a first embodiment of a pulsation damping member will be described with reference to FIG. 1 to FIG. 4.

A pulsation damping member 1 of the present embodiment includes a first metal plate 11 and a second metal plate 12 that are provided in an axial direction along a central axis O. The first metal plate 11 and the second metal plate 12 are formed of, for example, stainless steel. The first metal plate 11 and the second metal plate 12 are each formed in a disc shape and are disposed coaxially with the central axis O.

Hereinafter, when viewed from the axial direction, a direction intersecting the central axis O is referred to as a radial direction, and a direction of revolving around the central axis O is referred to as a circumferential direction.

The first metal plate 11 and the second metal plate 12 respectively have joint parts 13 extending over the entire length in the circumferential direction and are joined to each other. The joint parts 13 extend in the radial direction. The joint parts 13 of the first metal plate 11 and the second metal plate 12 are joined to each other by, for example, welding, adhesion, or the like. Incidentally, the joint parts 13 may extend in a direction intersecting the radial direction such as, for example, the axial direction.

An expansion/contraction space 14 in which the first metal plate 11 and the second metal plate 12 are not in contact with each other over the entire region is provided in a portion positioned on an inner side with respect to the joint parts 13 in the radial direction.

The pulsation damping member 1 is used by being provided inside a housing chamber connected to a pipe of a fluid pressure system. The pulsation damping member 1 suppresses pulsation due to the first metal plate 11 and the second metal plate 12 elastically deforming in the axial direction while expanding and contracting the expansion/contraction space 14 in the axial direction in accordance with pulsation of a fluid flowing through the pipe. As the fluid pressure system, a liquid pressure system or the like including a hydraulic system such as, for example, a brake, a fuel supply pump of an engine, and a transmission can be mentioned as an example.

A crest portion 15 and a valley portion 17 are provided to line up in the radial direction in a portion of the first metal plate 11 positioned on an inner side with respect to the joint part 13 in the radial direction. The crest portion 15 and the valley portion 17 extend over the entire length in the circumferential direction. A crest portion 16 and a valley portion 18 are provided to line up in the radial direction in a portion of the second metal plate 12 positioned on an inner side with respect to the joint part 13 in the radial direction. The crest portion 16 and the valley portion 18 extend over the entire length in the circumferential direction.

Hereinafter, the crest portion of the first metal plate 11 will be referred to as a first crest portion 15, the crest portion of the second metal plate 12 will be referred to as a second crest portion 16, the valley portion of the first metal plate 11 will be referred to as a first valley portion 17, and the valley portion of the second metal plate 12 will be referred to as a second valley portion 18.

The second crest portion 16 enters inside the first crest portion 15, and the first valley portion 17 enters inside the second valley portion 18. The number of the first crest portions 15 is the same as the number of the second crest portions 16, and the number of the first valley portions 17 is the same as the number of the second valley portions 18. The number of the first crest portions 15 or the second crest portions 16 is larger than the number of the first valley portions 17 or the second valley portions 18.

Incidentally, the number of the first crest portions 15 or the second crest portions 16 may be equal to or less than the number of the first valley portions 17 or the second valley portions 18.

The crest portions 15 and 16 and the valley portions 17 and 18 each have an apex portion 21 and a pair of inclined portions 23 that sandwich the apex portion 21 in the radial direction.

The apex portion 21 is formed in a curved surface shape. Incidentally, the apex portion 21 may be formed in a planar shape or the like. The pair of inclined portions 23 become further away from each other in the radial direction with distance away from the apex portion 21 in the axial direction.

The apex portions 21 of the plurality of first crest portions 15 are positioned at a lower position on the second metal plate 12 side as they are positioned farther outward in the radial direction. The apex portions 21 of the plurality of second crest portions 16 are positioned at a higher position on the first metal plate 11 side as they are positioned farther outward in the radial direction.

Incidentally, the axial positions of the apex portions 21 of the plurality of first crest portions 15 may be changed as appropriate, such as, for example, making the axial positions the same as each other. The axial positions of the apex portions 21 of the plurality of second crest portions 16 may also be changed as appropriate, such as, for example, the axial positions made the same as each other.

A concave curved surface portion 19 disposed coaxially with the central axis O is formed at a center portion of each of the first metal plate 11 and the second metal plate 12 in the radial direction. In each of the first metal plate 11 and the second metal plate 12, a depth of the concave curved surface portion 19 is smaller than a depth of each of the valley portions 17 and 18.

Incidentally, the depth of the concave curved surface portion 19 may be equal to or larger than the depth of each of the valley portions 17 and 18. Also, a convex curved surface portion, a flat surface portion, or the like may be formed at the center portion of each of the first metal plate 11 and the second metal plate 12 in the radial direction.

The expansion/contraction space 14 has a wave shape that extends continuously over the entire length in the radial direction while bending in the axial direction in a longitudinal sectional view in the radial direction. A size in the axial direction of an outer end portion 14*a* of the expansion/contraction space 14, which is positioned on an outermost side in the radial direction and continuous with the joint parts 13, increases toward an inner side in the radial direction.

The pulsation damping member 1 has a symmetrical shape with respect to the central axis O in a longitudinal sectional view.

Figure 3:
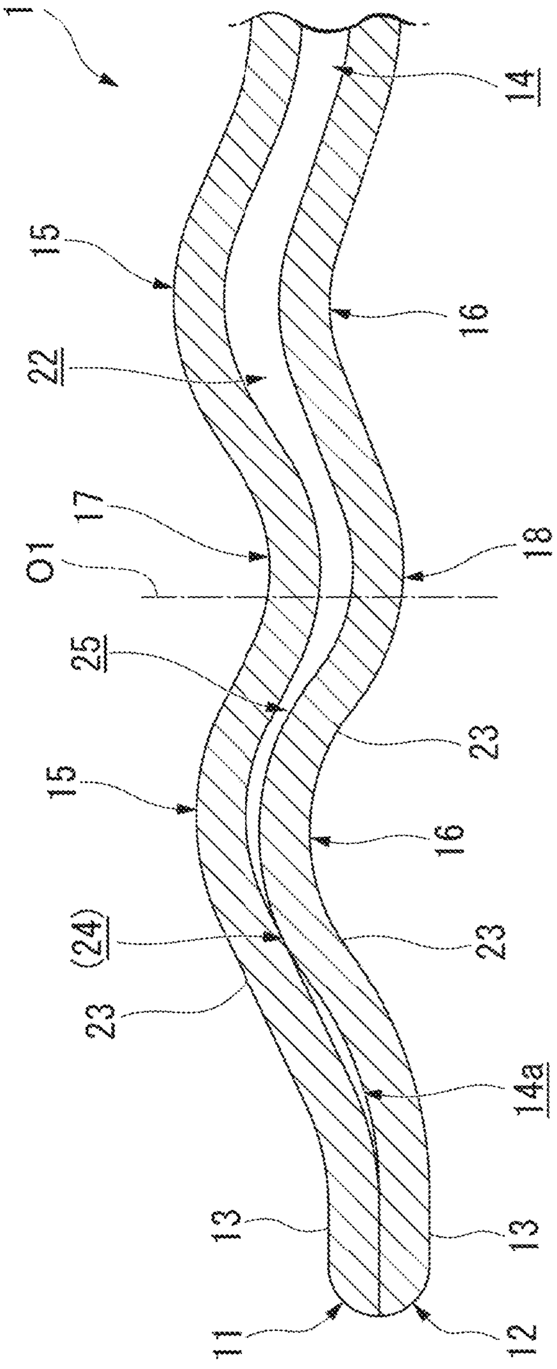
FIG. 3 is a view illustrating a state in which an axial compressive force is applied to the pulsation damping member of FIG. 1.

A portion of the expansion/contraction space 14 positioned on an inner side with respect to the outer end portion 14*a* in the radial direction is referred to as an inner space 22. In the present embodiment, as illustrated in FIG. 3, a first constricted portion 24, which is first crushed in the axial direction in the inner space 22 of the expansion/contraction space 14 to bring the first metal plate 11 and the second metal plate 12 into contact with each other when a fluid pressure in the housing chamber in which the pulsation damping member 1 is installed has risen, is positioned radially outward of a center portion O1 between the central axis O and the joint parts 13 in the radial direction.

Figure 2:
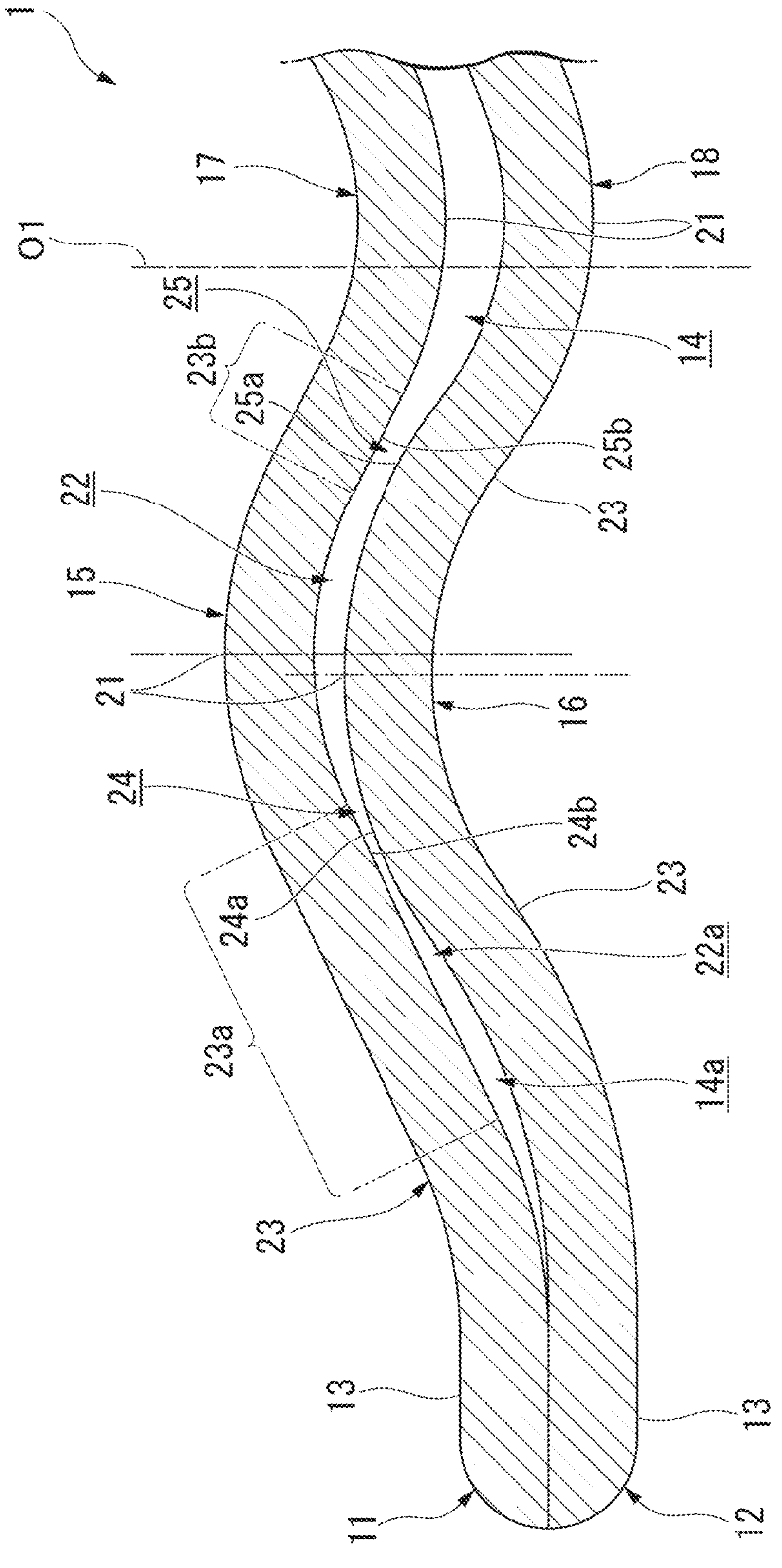
FIG. 2 is an enlarged view of part II of FIG. 1.

As illustrated in FIG. 1 and FIG. 2, a size in the axial direction of the first constricted portion 24 is the smallest in the inner space 22 of the expansion/contraction space 14. Incidentally, the size in the axial direction of the first constricted portion 24 may not be the smallest in the inner space 22.

The first constricted portion 24 is provided between the inclined portions 23 of the first metal plate 11 and the second metal plate 12. Incidentally, the first constricted portion 24 may be provided between the apex portions 21 of the first metal plate 11 and the second metal plate 12.

In the first metal plate 11 and the second metal plate 12, the apex portions 21 of the crest portions 15 and 16 or the valley portions 17 and 18 that define the first constricted portion 24 are deviated from each other in the radial direction. That is, in the first crest portion 15 and the second crest portion 16 defining the first constricted portion 24, the apex portion 21 of the first crest portion 15 and the apex portion 21 of the second crest portion 16 are deviated from each other in the radial direction, or in the first valley portion 17 and the second valley portion 18 defining the first constricted portion 24, the apex portion 21 of the first valley portion 17 and the apex portion 21 of the second valley portion 18 are deviated from each other in the radial direction.

In the illustrated example, in the first metal plate 11 and the second metal plate 12, only at the crest portions 15 and 16 or the valley portions 17 and 18 defining the first constricted portion 24, the apex portions 21 are deviated from each other in the radial direction, and at other crest portions 15 and 16 or at other valley portions 17 and 18 in which one of them enters inside the other, the radial positions of the apex portions 21 are substantially the same.

Incidentally, for all the crest portions 15 and 16 and the valley portions 17 and 18, the radial positions of the apex portions 21 of the crest portions 15 and 16 or the valley portions 17 and 18 in which one of them enters inside the other may coincide with each other or may be different from each other.

In the first metal plate 11 and the second metal plate 12, the apex portions 21 of the crest portions 15 and 16 or the valley portions 17 and 18 defining the first constricted portion 24 are formed such that, in a longitudinal sectional view, a radius of curvature of the apex portion 21 of the crest portion 16 or the valley portion 17 on a side of entering inside the other crest portion or valley portion is smaller than a radius of curvature of the apex portion 21 of the crest portion 15 or the valley portion 18 on a side into which the other crest portion or valley portion enters. That is, in the first crest portion 15 and the second crest portion 16 defining the first constricted portion 24, a radius of curvature of the apex portion 21 of the second crest portion 16 is formed to be smaller than a radius of curvature of the apex portion 21 of the first crest portion 15, or in the first valley portion 17 and the second valley portion 18 defining the first constricted portion 24, a radius of curvature of the apex portion 21 of the first valley portion 17 is formed to be smaller than a radius of curvature of the apex portion 21 of the second valley portion 18.

In the illustrated example, for all the apex portions 21 of the crest portions 15 and 16 and the valley portions 17 and 18, a radius of curvature of the second crest portion 16 is smaller than a radius of curvature of the first crest portion 15, and a radius of curvature of the first valley portion 17 is smaller than a radius of curvature of the second valley portion 18 in a longitudinal sectional view.

Incidentally, of all the apex portions 21 of the crest portions 15 and 16 and the valley portions 17 and 18, only at the crest portions 15 and 16 or the valley portions 17 and 18 defining the first constricted portion 24, a radius of curvature of the apex portion 21 of the crest portion 16 or the valley portion 17 on a side of entering inside the other crest portion or valley portion may be formed to be smaller than a radius of curvature of the apex portion 21 of the crest portion 15 or the valley portion 18 on a side into which the other crest portion or valley portion enters in a longitudinal sectional view.

As illustrated in FIG. 2, of portions 24*a* and 24*b* that define the first constricted portion 24 in the crest portions 15 and 16 or the valley portions 17 and 18 in the first metal plate 11 and the second metal plate 12, one portion 24*a* of them enters inside the other portion 24*b* and is formed in a curved surface shape that is convex toward the other portion 24*b*. The other portion 24*b* has a linear shape in a longitudinal sectional view in the axial direction.

Incidentally, in the first metal plate 11 and the second metal plate 12, both the portions 24*a* and 24*b* defining the first constricted portion 24 may be formed in, for example, a curved surface shape or a planar shape.

The first constricted portion 24 is defined in the inclined portion (hereinafter referred to as an outer inclined portion) 23, of the pair of inclined portions 23 in the crest portions 15 and 16 or the valley portions 17 and 18 continuous with the joint parts 13, positioned on an outer side in the radial direction.

In the illustrated example, the crest portions 15 and 16 are continuous with the joint parts 13 in the first metal plate 11 and the second metal plate 12. The first constricted portion 24 is provided between the outer inclined portions 23 of the crest portions 15 and 16 positioned on an outermost side in the radial direction, of the plurality of crest portions 15 and 16 in the first metal plate 11 and the second metal plate 12. In the crest portions 15 and 16, the first constricted portion 24 is defined in a portion of the outer inclined portion 23 positioned closer to the apex portion 21.

In the crest portions 15 and 16 defining the first constricted portion 24, the apex portion 21 of the second crest portion 16 is positioned on an outer side with respect to the apex portion 21 of the first crest portion 15 in the radial direction. The center portion O1 between the central axis O and the joint parts 13 in the radial direction is adjacent to the apex portions 21 of the valley portions 17 and 18, which are continuous with the crest portions 15 and 16 defining the first constricted portion 24, from an outer side in the radial direction.

In the expansion/contraction space 14, a size in the axial direction of a portion positioned between the outer end portion 14*a* and the first constricted portion 24, that is, a size in the axial direction of the outer end portion 22*a* in the radial direction of the inner space 22, decreases inward in the radial direction. In the outer inclined portions 23 defining the first constricted portion 24, a linear portion 23*a* including the other portion 24*b* of the first constricted portion 24 and having a linear shape in a longitudinal sectional view is provided in the first metal plate 11. The linear portion 23*a* defines a portion of the expansion/contraction space 14 from a central region of the outer end portion 14*a* in the radial direction to the first constricted portion 24 on the whole.

Figure 4:
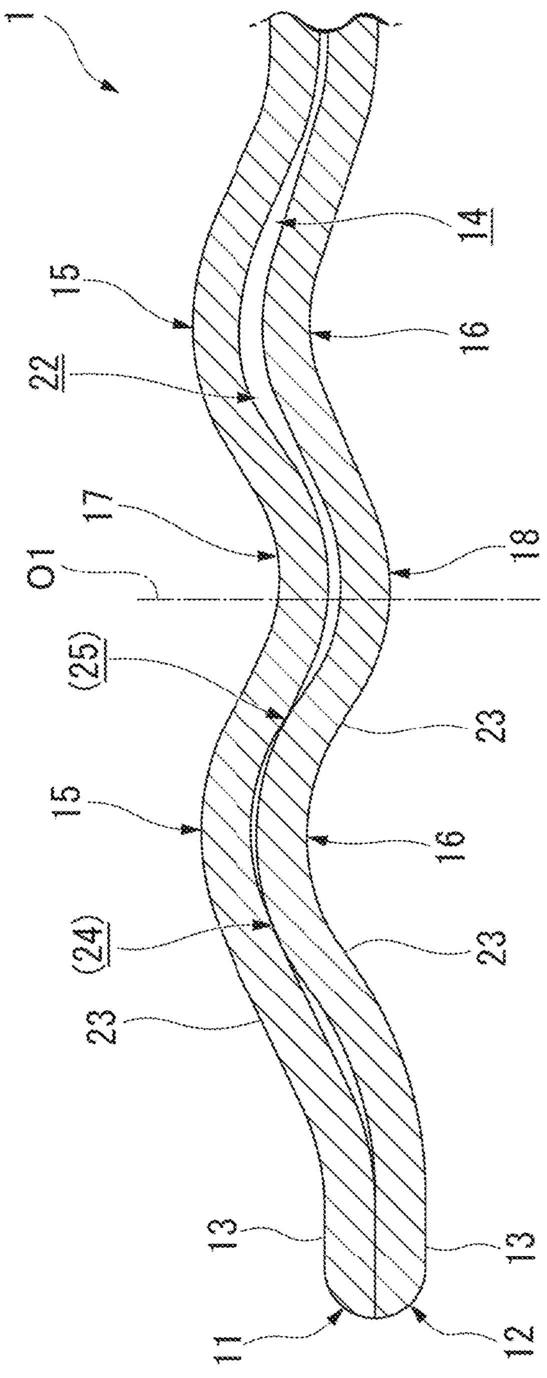
FIG. 4 is a view illustrating a state in which an axial compressive force is applied to the pulsation damping member of FIG. 1.

As illustrated in FIG. 4, a second constricted portion 25, which is crushed in the axial direction following the first constricted portion 24 in the inner space 22 of the expansion/contraction space 14 to bring the first metal plate 11 and the second metal plate 12 into contact with each other when the fluid pressure in the housing chamber in which the pulsation damping member 1 is installed has risen, is positioned on an inner side with respect to the first constricted portion 24 in the radial direction. The second constricted portion 25 is positioned radially outward of the center portion O1 between the central axis O and the joint parts 13 in the radial direction.

Of the pair of inclined portions 23 sandwiching the same apex portion 21 in the radial direction, the outer inclined portion 23 positioned on an outer side in the radial direction defines the first constricted portion 24, and an inner inclined portion 23 positioned on an inner side in the radial direction defines the second constricted portion 25.

In a portion of the expansion/contraction space 14 sandwiched in the axial direction by the pair of inner inclined portions 23 defining the second constricted portion 25, a portion positioned on a side opposite to the above-described the same apex portion 21, that is, on an inner side in the radial direction, with respect to the second constricted portion 25, becomes wider with distance away from the second constricted portion 25 inward in the radial direction. Of portions 25*a* and 25*b* defining the second constricted portion 25 in the crest portions 15 and 16 or the valley portions 17 and 18 in the first metal plate 11 and the second metal plate 12, one portion 25*a* of them enters inside the other portion 25*b* and is formed in a curved surface shape that is convex toward the other portion 25*b*. The other portion 25*b* has a linear shape in a longitudinal sectional view in the axial direction. Of the inner inclined portions 23 defining the second constricted portion 25, a linear portion 23*b* including the other portion 25*b* of the second constricted portion 25 and having a linear shape in a longitudinal sectional view is provided in the first metal plate 11. The linear portion 23*b* is smaller than the linear portion 23*a* of the outer inclined portion 23.

Incidentally, in the first metal plate 11 and the second metal plate 12, both the portions 25*a* and 25*b* defining the second constricted portion 25 may be formed in, for example, a curved surface shape or a planar shape.

As described above, according to the pulsation damping member 1 of the present embodiment, the second crest portion 16 enters inside the first crest portion 15, and the first valley portion 17 enters inside the second valley portion 18. Therefore, as illustrated in FIGS. 3 and 4, when the fluid pressure in the housing chamber has risen, the second crest portion 16 enters deeply inside the first crest portion 15, and the first valley portion 17 enters deeply inside the second valley portion 18. Thereby, compression strokes of the first metal plate 11 and the second metal plate 12 in the axial direction can be secured while reducing a size in the axial direction of the entire pulsation damping member 1.

The first constricted portion 24 having a smallest size in the axial direction in the inner space 22 of the expansion/contraction space 14 is positioned on a radially outward side from the center portion O1 between the central axis O and the joint parts 13 in the radial direction. Therefore, as illustrated in FIG. 3, the first constricted portion 24, which is first crushed in the axial direction in the inner space 22 to bring the first metal plate 11 and the second metal plate 12 into contact with each other when the fluid pressure in the housing chamber has risen, can be positioned close to the joint parts 13. Therefore, a radial size of an outer circumferential portion of the expansion/contraction space 14 positioned between the first constricted portion 24 and the joint part 13 can be reduced. Thereby, after the first constricted portion 24 is crushed in the axial direction in the process in which the fluid pressure in the housing chamber rises, it becomes difficult for the outer circumferential portion of the expansion/contraction space 14 to contract and deform further in the axial direction, and a stress generated in the joint parts 13 can be reduced.

As described above, compression strokes of the first metal plate 11 and the second metal plate 12 in the axial direction can be secured while reducing a size in the axial direction of the entire pulsation damping member 1, and load applied to the joint parts 13 can be suppressed.

The first constricted portion 24 is positioned radially outward of the center portion O1 between the central axis O and the joint parts 13 in the radial direction. Therefore, a radial distance between the first constricted portion 24 and the central axis O can be easily secured. Thereby, it is possible to prevent a region to be contracted and deformed in the axial direction after the first constricted portion 24 is crushed in the axial direction in the process in which the fluid pressure in the housing chamber rises from reducing in size, and rapid increase in spring constant in the axial direction of the pulsation damping member 1 can be suppressed.

The first constricted portion 24 is provided between the inclined portions 23 of the first metal plate 11 and the second metal plate 12. Therefore, it is possible to easily bring the portions 24*a* and 24*b* facing each other in the axial direction and defining the first constricted portion 24 into surface contact with each other or the like when the fluid pressure in the housing chamber has risen, and load applied to the joint parts 13 can be reliably suppressed.

In the first metal plate 11 and the second metal plate 12, the apex portions 21 of the crest portions 15 and 16 or the valley portions 17 and 18 defining the first constricted portion 24 are deviated from each other in the radial direction. Therefore, the first constricted portion 24 with a desired size in the axial direction can be easily provided.

In the first metal plate 11 and the second metal plate 12, the apex portions 21 of the crest portions 15 and 16 or the valley portions 17 and 18 defining the first constricted portion 24 are formed such that, in a longitudinal sectional view, a radius of curvature of the apex portion 21 of the crest portion 16 or the valley portion 17 on a side of entering inside the other crest portion or valley portion is smaller than a radius of curvature of the apex portion 21 of the crest portion 15 or the valley portion 18 on a side into which the other crest portion or valley portion enters. Therefore, the first constricted portion 24 with a desired size in the axial direction can be easily provided.

Of the portions 24*a* and 24*b* defining the first constricted portion 24 in the first metal plate 11 and the second metal plate 12, one portion 24*a* of them enters inside the other portion 24*b* and is formed in a curved surface shape that is convex toward the other portion 24*b*. The other portion 24*b* has a linear shape in a longitudinal sectional view. Therefore, the first constricted portion 24 with a desired size in the axial direction can be easily provided.

The first constricted portion 24 is defined in the outer inclined portions 23 of the crest portions 15 and 16 or the valley portions 17 and 18 continuous with the joint parts 13. Therefore, the first constricted portion 24 can be reliably positioned close to the joint parts 13, and it is possible to easily bring the portions 24*a* and 24*b* facing each other in the axial direction and defining the first constricted portion 24 into surface contact with each other, or the like. Thereby, load applied to the joint parts 13 can be reliably suppressed.

The first constricted portion 24 is defined in the outer inclined portions 23 of the crest portions 15 and 16 or the valley portions 17 and 18 continuous with the joint parts 13. Therefore, a radial distance between the first constricted portion 24 and the central axis O can be easily secured. Thereby, a rapid increase in spring constant after the first constricted portion 24 is crushed in the axial direction in the process in which the fluid pressure in the housing chamber rises can be reliably suppressed.

As illustrated in FIG. 4, the second constricted portion 25, which is crushed in the axial direction following the first constricted portion 24 in the inner space 22 to bring the first metal plate 11 and the second metal plate 12 into contact with each other when the fluid pressure in the housing chamber has risen, is positioned on an inner side with respect to the first constricted portion 24 in the radial direction. Therefore, the expansion/contraction space 14 can be contracted and deformed in the axial direction sequentially from an outer side to an inner side in the radial direction in the process in which the fluid pressure in the housing chamber rises, and compression strokes of the first metal plate 11 and the second metal plate 12 in the axial direction can be easily secured.

The first constricted portion 24 and the second constricted portion 25 are respectively defined in the pair of inclined portions 23 that sandwich the same apex portion 21 in the radial direction. Therefore, a radial distance between the first constricted portion 24 and the second constricted portion 25 can be reduced. Therefore, compression strokes of the first metal plate 11 and the second metal plate 12 in the axial direction can be more easily secured, and load applied to the joint parts 13 can be reliably suppressed. Also, a radial distance between the second constricted portion 25 and the central axis O is easily secured. Thereby, it is possible to prevent a region to be contracted and deformed in the axial direction after the second constricted portion 25 is crushed in the axial direction in the process in which the fluid pressure in the housing chamber rises from reducing in size, and rapid increase in spring constant can be suppressed.

The pair of inclined portions 23 define the first constricted portion 24 and the second constricted portion 25, respectively. Therefore, it is possible to easily bring the portions 24*a* and 24*b* facing each other in the axial direction and defining the first constricted portion 24 into surface contact with each other and the portions 25*a* and 25*b* facing each other in the axial direction and defining the second constricted portion 25 into surface contact with each other, and the like. Thereby, load applied to the joint parts 13 can be reliably suppressed.

Figure 5:
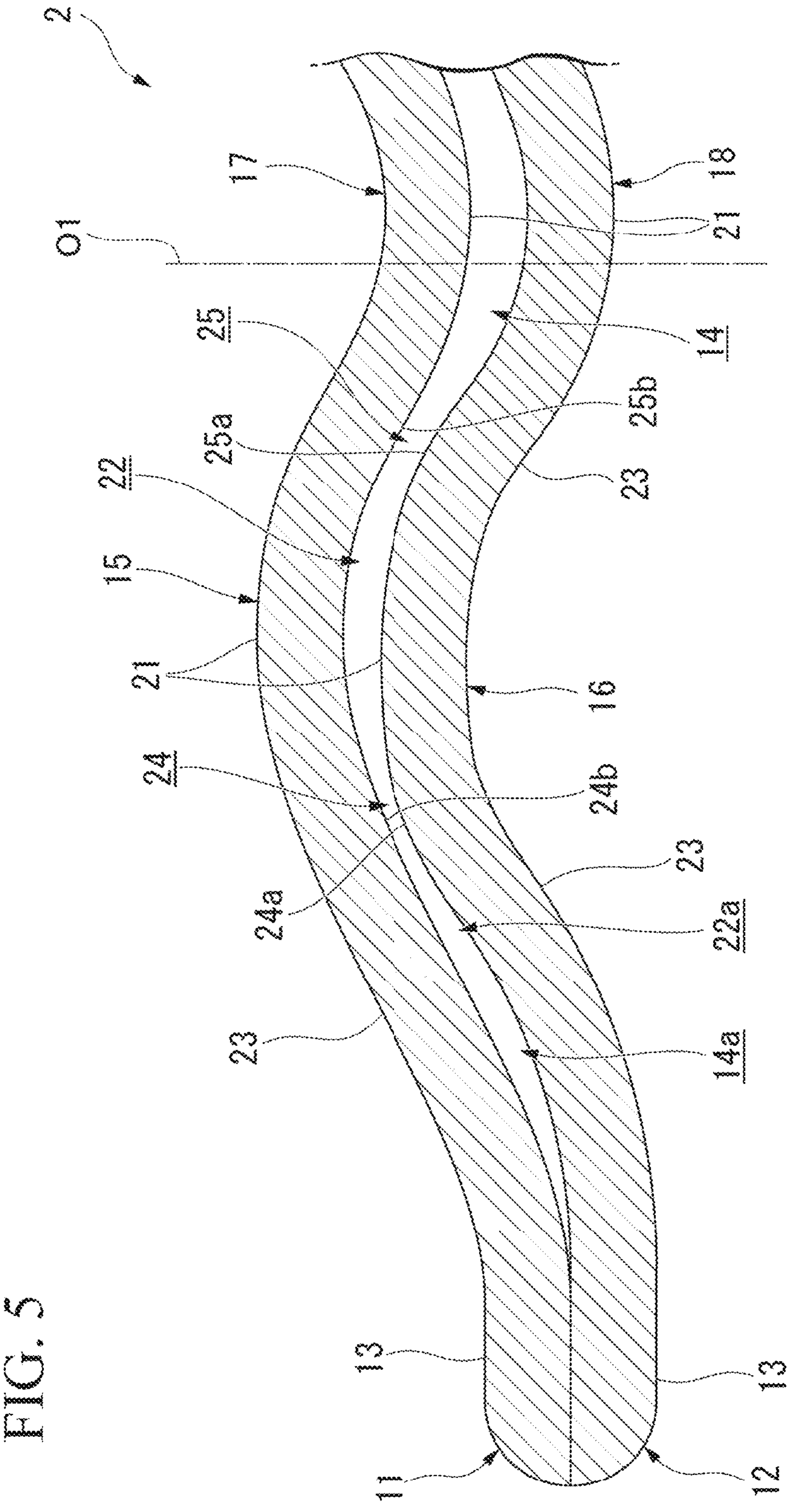
FIG. 5 is a partially enlarged longitudinal sectional view of a pulsation damping member of a second embodiment.

Next, a pulsation damping member 2 according to a second embodiment of the present invention will be described with reference to FIG. 5.

In the second embodiment, components the same as those in the first embodiment will be denoted by the same reference signs, description thereof will be omitted, and only different points will be described.

In the pulsation damping member 2 of the present embodiment, of the portions 24*a* and 24*b* defining the first constricted portion 24 in the crest portions 15 and 16 or the valley portions 17 and 18 in the first metal plate 11 and the second metal plate 12, one portion 24*a* of them enters inside the other portion 24*b* and is formed in a curved surface shape that is convex toward the other portion 24*b*. In a longitudinal sectional view in the axial direction, the other portion 24*b* is formed in a curved surface shape that is convex in the same direction as the direction in which the one portion 24*a* is convex, and a radius of curvature of the other portion 24*b* is larger than a radius of curvature of the one portion 24*a*.

Of portions 25*a* and 25*b* defining the second constricted portion 25 in the crest portions 15 and 16 or the valley portions 17 and 18 in the first metal plate 11 and the second metal plate 12, one portion 25*a* of them enters inside the other portion 25*b* and is formed in a curved surface shape that is convex toward the other portion 25*b*. In a longitudinal sectional view in the axial direction, the other portion 25*b* is formed in a curved surface shape that is convex in the same direction as the direction in which the one portion 25*a* is convex, and a radius of curvature of the other portion 25*b* is larger than a radius of curvature of the one portion 25*a*.

In the first metal plate 11 and the second metal plate 12, the apex portions 21 of the crest portions 15 and 16 or the valley portions 17 and 18 defining the first constricted portion 24 are formed such that, in a longitudinal sectional view, a radius of curvature of the apex portion 21 of the crest portion 16 or the valley portion 17 on a side of entering inside the other crest portion or valley portion is larger than a radius of curvature of the apex portion 21 of the crest portion 15 or the valley portion 18 on a side into which the other crest portion or valley portion enters.

As described above, according to the pulsation damping member 2 of the present embodiment, of the portions 24*a* and 24*b* defining the first constricted portion 24 in the crest portions 15 and 16 or the valley portions 17 and 18 in the first metal plate 11 and the second metal plate 12, one portion 24*a* of them enters inside the other portion 24*b* and is formed in a curved surface shape that is convex toward the other portion 24*b*. In a longitudinal sectional view, the other portion 24*b* is formed in a curved surface shape that is convex in the same direction as the direction in which the one portion 24*a* is convex, and a radius of curvature of the other portion 24*b* is larger than a radius of curvature of the one portion 24*a*. Therefore, the first constricted portion 24 with a desired size in the axial direction can be easily provided.

The technical scope of the present invention is not limited to the above-described embodiments, and various modifications can be made within the scope not departing from the meaning of the present invention.

For example, the first constricted portion 24 and the second constricted portion 25 may be defined at the apex portions 21 or the like of the crest portions 15 and 16 or the valley portions 17 and 18.

The valley portions 17 and 18 may be continuous with the joint parts 13.

The second constricted portion 25 may not be provided.

One or more other constricted portions, which are crushed in the axial direction following the second constricted portion 25 in the inner space 22 of the expansion/contraction space 14 to bring the first metal plate 11 and the second metal plate 12 into contact with each other when a fluid pressure in the housing chamber in which the pulsation damping member 1 or 2 is installed has risen, may be provided on an inner side of the second constricted portion 25 in the radial direction.

Furthermore, the components in the above-described embodiments can be appropriately replaced with well-known components within a range not departing from the meaning of the present invention, and the embodiments and modified examples described above may be appropriately combined.

INDUSTRIAL APPLICABILITY

According to the present invention, it is possible to obtain a pulsation damping member in which compression strokes of a first metal plate and a second metal plate in an axial direction can be secured while reducing a size in the axial direction of the entire pulsation damping member, and load applied to joint parts can be suppressed.

REFERENCE SIGNS LIST

1, 2 Pulsation damping member
11 First metal plate
12 Second metal plate
13 Joint part
14 Expansion/contraction space
14*a* Outer end portion of expansion/contraction space
15, 16 Crest portion
17, 18 Valley portion
21 Apex portion
22 Inner space
22*a* Outer end portion of inner space
23 Inclined portion
24 First constricted portion
25 Second constricted portion
O Central axis
O1 Center portion

The invention claimed is:

1. A pulsation damping member which is disposed inside a housing chamber connected to a pipe of a fluid pressure system, the pulsation damping member comprising:

a first metal plate and a second metal plate provided in an axial direction along a central axis, wherein the first metal plate and the second metal plate respectively include joint parts extending over the entire length in a circumferential direction around the central axis and joined to each other, an expansion/contraction space is provided between the first metal plate and the second metal plate in a portion positioned on an inner side with respect to the joint parts in a radial direction intersecting the central axis when viewed from the axial direction, the first metal plate and the second metal plate are configured to elastically deform in the axial direction while expanding and contracting the expansion/contraction space in the axial direction in accordance with pulsation of a fluid flowing through the pipe, a crest portion and a valley portion extending over the entire length in the circumferential direction are provided to line up in the radial direction in a portion positioned on an inner side with respect to the joint parts in the radial direction in each of the first metal plate and the second metal plate, the crest portion of the second metal plate is fitted within the crest portion of the first metal plate, and the valley portion of the first metal plate is fitted within the valley portion of the second metal plate, the expansion/contraction space includes an outer end portion positioned on an outermost side in the radial direction and continuous with the joint parts, a size in the axial direction of the outer end portion of the expansion/contraction space increases toward an inner side in the radial direction, the size in the axial direction of the expansion/contraction space being a distance in the axial direction between the first metal plate and the second metal plate, the expansion/contraction space includes an inner space which is a portion positioned on an inner side with respect to the outer end portion in the radial direction, and the inner space includes a first constricted portion positioned on a radially outward side from a center portion between the central axis and the joint parts in the radial direction, the first constricted portion is a portion of the inner space, which has a smallest size in the axial direction, the expansion/contraction space includes an intermediate portion positioned between the outer end portion and the first constricted portion, and a size in the axial direction of the intermediate portion of the expansion/contraction space decreases toward the inner side in the radial direction.

2. The pulsation damping member according to claim 1, wherein the crest portion and the valley portion each include an apex portion and a pair of inclined portions sandwiching the apex portion in the radial direction, and the first constricted portion is disposed between the inclined portions of the first metal plate and the second metal plate.

3. The pulsation damping member according to claim 1, wherein, in the first metal plate and the second metal plate, apex portions of the crest portions or the valley portions defining the first constricted portion are deviated from each other in the radial direction.

4. The pulsation damping member according to claim 1, wherein, in the first metal plate and the second metal plate, apex portions of the crest portions or the valley portions defining the first constricted portion are formed such that, in a longitudinal sectional view in the axial direction, a radius of curvature of the apex portion of the crest portion or valley portion on a side which is fitted within the crest portion or valley portion is smaller than a radius of curvature of the apex portion of the crest portion or valley portion on a side within which the other crest portion or valley portion is fitted.

5. The pulsation damping member according to claim 1, wherein, of first and second portions of the crest portions or the valley portions defining the first constricted portion in the first metal plate and the second metal plate, the first portion is fitted within the second portion and has a curved surface shape which is convex toward the second portion, and the second portion has a linear shape in a longitudinal sectional view in the axial direction.

6. The pulsation damping member according to claim 1, wherein, of first and second portions of the crest portions or the valley portions defining the first constricted portion in the first metal plate and the second metal plate, the first portion is fitted within the second portion and has a curved surface shape which is convex toward the second portion, and the second portion has a curved surface shape which is convex in the same direction as the direction in which the first portion is convex, and a radius of curvature of the second portion is larger than a radius of curvature of the first portion in a longitudinal sectional view in the axial direction.

7. The pulsation damping member according to claim 1, wherein the crest portion and the valley portion each include an apex portion and a pair of inclined portions sandwiching the apex portion in the radial direction, and the first constricted portion is defined in an outer inclined portion, of the pair of inclined portions of the crest portion or the valley portion continuous with the joint part, positioned on an outer side in the radial direction.

8. The pulsation damping member according to claim 1, wherein the inner space of the expansion/contraction space includes a second constricted portion positioned on an inner side with respect to the first constricted portion in the radial direction, the second constricted portion being configured such that the second constricted portion is crushed in the axial direction following the first constricted portion in the inner space of the expansion/contraction space to bring the first metal plate and the second metal plate into contact with each other when a fluid pressure in the housing chamber has risen.

9. The pulsation damping member according to claim 8, wherein the crest portion and the valley portion each include an apex portion and a pair of inclined portions sandwiching the apex portion in the radial direction, and of the pair of inclined portions sandwiching the same apex portion in the radial direction, the outer inclined portion positioned on an outer side in the radial direction defines the first constricted portion, and an inner inclined portion positioned on an inner side in the radial direction defines the second constricted portion.

* * * * *